United States Patent
Myers et al.

(10) Patent No.: US 6,278,460 B1
(45) Date of Patent: Aug. 21, 2001

(54) CREATING A THREE-DIMENSIONAL MODEL FROM TWO-DIMENSIONAL IMAGES

(75) Inventors: Thomas B. Myers, Prior Lake; Robert Bodor, Eden Prairie, both of MN (US)

(73) Assignee: Point Cloud, Inc., Plymouth, MN (US)

( * ) Notice: Subject to any disclaimer, the term of this patent is extended or adjusted under 35 U.S.C. 154(b) by 0 days.

(21) Appl. No.: 09/211,899

(22) Filed: Dec. 15, 1998

(51) Int. Cl.[7] .................................................. G06T 17/00

(52) U.S. Cl. ........................ 345/424; 345/420; 382/154

(58) Field of Search .................................. 345/419, 420, 345/424; 382/154, 203, 241, 286, 291

(56) References Cited

U.S. PATENT DOCUMENTS

| | | | |
|---|---|---|---|
| 4,970,666 | 11/1990 | Welsh et al. | 364/522 |
| 4,989,152 | 1/1991 | Cheng | 364/474.24 |
| 5,365,603 | 11/1994 | Karmann | 382/48 |
| 5,444,478 | 8/1995 | Lelong et al. | 348/39 |
| 5,511,153 | * 4/1996 | Azarbayejani et al. | 395/119 |
| 5,566,283 | 10/1996 | Modegi et al. | 395/126 |
| 5,570,460 | 10/1996 | Ramanujam | 395/124 |
| 5,594,842 | 1/1997 | Kaufman et al. | 395/124 |
| 5,633,995 | * 5/1997 | McClain | 395/119 |
| 5,644,651 | 7/1997 | Cox et al. | 382/154 |
| 5,647,019 | 7/1997 | Iino et al. | 382/154 |
| 5,673,207 | 9/1997 | Nomura | 364/516 |
| 5,680,474 | 10/1997 | Iijima et al. | 382/154 |
| 5,684,887 | 11/1997 | Lee et al. | 382/107 |
| 5,706,416 | 1/1998 | Mann et al. | 395/127 |
| 5,710,875 | 1/1998 | Harashima et al. | 345/419 |
| 5,716,032 | 2/1998 | McIngvale | 244/185 |
| 5,717,792 | 2/1998 | Poggio et al. | 372/278 |
| 5,721,692 | 2/1998 | Nagaya et al. | 364/516 |
| 5,729,471 | 3/1998 | Jain et al. | 364/514 A |
| 5,818,959 | * 10/1998 | Webb et al. | 382/154 |

OTHER PUBLICATIONS

Bestor, G.S., "Recovering Feature and Observer Position by Projected Error Refinement", Dissertation Paper, University of Wisconsin—Madison, pp. 1–126, (1998).

Bolles, R.C., et al., "Epipolar–Plane Image Analysis: An Approach to Determining Structure from Motion", *International Journal of Computer Vision*, pp. 7–55, (1987).

Broida, T.J., et al., "Estimation of Object Motion Parameters from Noisy Images", *IEEE Transactions on Pattern Analysis and Machine Intelligence, 8*, 90–99, (Jan. 1986).

Broida, T.J., et al., "Recursive 3–D Motion Estimation from a Monocular Image Sequence", *IEEE Transactions on Aerospace and Electronic Systems, 26*, 639–656, (1990).

Gennery, D.B., "Tracking Known Three–Dimensional Objects", *Robotics and Teleoperator Group, Jet Propulsion Laboratory*, Pasadena, California, pp. 13–17, (1982).

Heel, J., "Dynamic Motion Vision", *Proceedings of DARPA Image Understanding Workshop*, Palo Alto, CA, 702–713, (1989).

(List continued on next page.)

Primary Examiner—Mark Zimmerman
Assistant Examiner—Enrique L Santiago
(74) Attorney, Agent, or Firm—Schwegman, Lundberg, Woessner & Kluth, P.A.

(57) ABSTRACT

A method is provided in which three-dimensional models are created from a number of two-dimensional images, e.g., a video stream of two-dimensional images or still images, using a single camera without prior knowledge of the position or orientation of the camera, its focal length, etc. The method derives a relative value related to the position or orientation of the camera for each two-dimensional image and then, based on the derived position or orientation, uses "ray casting" to develop the three-dimensional model based on intersecting rays through common features of sequential two-dimensional images.

46 Claims, 11 Drawing Sheets

OTHER PUBLICATIONS

Matthies, L., et al., "Kalman Filter–based Algorithms for Estimating Depth from Image Sequences", *International Journal of Computer Vision, 3*, 1989 Kluwer Academic Publishers, Manufactured in the Netherlands, 209–238, (1989).

Poelman, C.J., et al., "A Paraperspective Factorization Method for Shape and Motion Recovery", *School of Computer Science, Carnegie Mellon University, Pittsburgh, Pennsylvania, Report: CMU–CU–92–208*, pp. 1–30, (1994).

Shum, H., et al., "Principal Component Analysis with Missing Data and Its Application to Polyhedral Object Modeling", *IEEE Transactions on Pattern Analysis and Machine Intelligence, 17* (9), pp. 854–867, (Sep. 1995).

Shum, H.Y., "Modeling from Reality: Representation and Integration", Ph. D. Thesis in Robotics, Carnegie Mellon University, Pittsburgh, Pennsylvania, pp. 1–135, (Jul. 1996).

Thompson, E.H., "A Rational Algebraic Formulation of the Problem of Relative Orientation", *Photogrammetric Record, 3*(14), pp. 152–159, (1959).

Tomasi, C., "Shape and Motion from Image Streams: a Factorization Method", Ph. D. Thesis, Department of Computer Science, Carnegie Mellon University, (1991).

Voyles, R.M., et al., "Shape from Motion Decomposition as a Learning Approach for Autonomous Agents", *Proceedings of IEEE Conference on Systems, Man, and Cybernetics*, pp. 407–412, (1995).

Voyles, R.M., et al., "The Shape From Motion Approach to Rapid and Precise Force/Torque Sensor Calibration", *Journal of Dynamic Systems, Measurements, and Control, 119*, 229–235, (Jun. 1997).

* cited by examiner

CREATING A THREE-DIMENSIONAL MODEL FROM TWO-DIMENSIONAL IMAGES

TECHNICAL FIELD

The present invention relates generally to the field of computer modeling and, in particular, to creating a three-dimensional model from two-dimensional images.

BACKGROUND INFORMATION

Conventionally, computers display images in a standard two-dimensional format much like conventional photographic images. However, computer programmers have developed techniques over the years to create three-dimensional representations of objects for display on the computer. Unfortunately, these techniques tend to be cumbersome, complicated and difficult to implement on a routine basis.

One approach to creating a three-dimensional model is to start with two-dimensional images. The basic problem with creating a three-dimensional model in this manner is that of extracting the three-dimensional shape of the objects appearing in the sequence of two-dimensional images. The crux of the problem is that each two-dimensional image contains only a two-dimensional projection of the actual three-dimensional object, and in fact, may only contain a portion of the objects. Much work has been done on this to date.

Photogrammetry has been used to create three-dimensional models from two-dimensional images. This methodology has at least two formulations. The first formulation uses a pair of cameras locked together a fixed distance apart. The second one uses a single camera along with a position or orientation sensor. In the second case, the camera position must be known at all times, and is not derived from the images. This method requires that a human user identify a set number of points along the outline and shape of the same object appearing throughout multiple images. Once this is done, the program reconstructs a three-dimensional wire frame model of the object by calculating the three-dimensional locations of the points that the user selected and then mapping the two-dimensional image textures of the object onto that wire frame. This texture mapping introduces inherent distortions in the image.

Another methodology for creating a three-dimensional model from two-dimensional images is referred to as "optic flow." This methodology is based on the property that due to perspective, when a viewer moves relative to stationary objects, objects closer to the viewer appear to move more in the viewers field of view than objects far away. The method estimates depth (the third dimension) from relative motion of identified objects in the two-dimensional image sequence. This method works because the distance from an object and the object's perceived shape are inherently linked due to perspective. For example, the far side of a building looks smaller than the near side. This method requires that the objects in an image be identified and tracked from frame to frame. It suffers greatly from occlusions and incomplete data because these things make tracking difficult. In addition, it is very sensitive to noise because errors in size or motion measurement are magnified greatly when estimating relative depth. In addition it requires a known camera position.

Another methodology for creating a three-dimensional model from two-dimensional images is known as "shape from motion." This methodology formulates the problem in linear algebra. In most implementations, all of the images in the sequence are used at once in a single calculation that yields the desired output (a closed-form solution). That output is either the shape of the object given the camera motion, or the camera motion given the shape of the objects, or both shape and motion.

In order to find both shape and motion, it is necessary to make them independent of one another. This is a problem since in a perspective projection they are related as described above. Therefore, under this formulation, it becomes necessary to assume an orthographic projection. (This means that all lines of vision are parallel and thus objects do not get smaller with distance.) This has the severe disadvantage that it introduces distortion. For example, this method would assume that the far side of a building in an image is, in fact, smaller than the near side, and thus model the building in three dimensions with one side shorter than the other. There are at least two formulations of this structure from motion methodology: one that uses an iterative method, and one that uses a closed-form method.

In addition there are drawbacks to closed form solutions: They require all of the data and cannot calculate an answer as images are acquired, thus cannot be made into real time solutions. Also, they put all of the input data into a number of large matrices and operate on those to find the solution. As a result, any missing matrix values causes serious problems, including making it unsolvable without filling in those values with guesses, thus introducing large errors. In addition, this method also tracks a relatively small number of points and texture maps onto those thus introducing texture warping.

For the reasons stated above, and for other reasons stated below which will become apparent to those skilled in the art upon reading and understanding the present specification, there is a need in the art for an improved technique for developing a three-dimensional model from two-dimensional images.

SUMMARY

The above mentioned problems with three-dimensional computer modeling and other problems are addressed by the present invention and will be understood by reading and studying the following specification. Three-dimensional models are created from two-dimensional images, e.g., a number of two-dimensional still images or a video stream with a number of video frames, without prior knowledge of the position of the camera, its focal length, etc. by deriving a relative value related to the position or orientation of the camera for each two-dimensional image and then, based on the derived value, using "ray casting" to develop the three-dimensional model based on intersecting rays through common features of sequential images. Ray casting includes but is not limited to forming a three-dimensional vector assuming a pinhole projection. The vector originates at the focal point or camera position, passes through a selected pixel of the two-dimensional video image, and passes through at least one voxel of the three-dimensional model.

In one embodiment, the value related to the camera position or orientation is determined using ray casting based on a select number of features of each frame of a video stream. For example, a few features are selected and tracked through the sequence of images in the video stream. With the initial frame of the video stream, the value related to the camera position or orientation is locked down at an arbitrary position, e.g., the origin $\{0,0,0\}$ in $\{x,y,z\}$ coordinates. The camera position or orientation of the next frame is set at a selected location and the intersections of the rays through the select number of features in the two frames are analyzed.

The position or orientation of the camera for the next frame is moved, iteratively, until the selected rays from the first frame intersect with the corresponding rays of the second frame within an acceptable error level, e.g., a minimum error level. This procedure is repeated for subsequent pairs of frames until the camera position or orientation is determined for each frame. It is noted that the features used to find the camera position may be different from the features used to create the points of the three-dimensional model.

In one embodiment, the three-dimensional model is developed by casting rays through each pixel of a selected feature in a pair of frames. These rays are compared to determine intersections in quality, e.g., color, and location in the three-dimensional space. Voxels of the model are derived based on these intersections.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
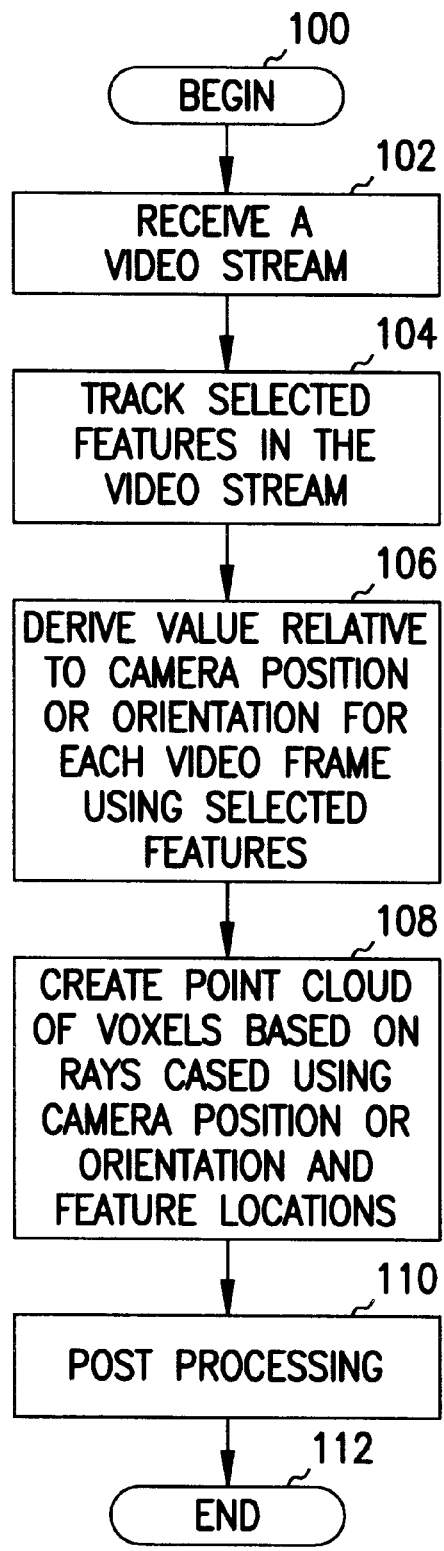
FIG. 1 is a flow chart that illustrates one embodiment of a process for developing a three-dimensional model of an object from two-dimensional images according to the teachings of the present invention.

FIG. 1 is a flow chart that illustrates one embodiment of a process for developing a three-dimensional model of an object from two-dimensional images, e.g., a video stream or still images, according to the teachings of the present invention. The method creates a true color, three-dimensional point cloud model for any surface, environment, scene or object captured in two-dimensional images such as a video stream from a conventional video camera.

Each point or voxel of the point cloud model comprises three-dimensional coordinates along with a quality value, e.g., a 24 bit color value. Advantageously, by including color values in the data set for each voxel, the method avoids creating distortions inherent in conventional approaches due to mapping texture from two-dimensional images onto a three-dimensional model.

For sake of clarity, the specification describes the embodiments of the present invention in terms of modeling an "object." However, it is understood that the term "object" as used in the specification and claims includes surfaces, environments, collections of individual objects, and other things that are susceptible to three-dimensional modeling. Additionally, the term "video stream" as used herein refers to a sequence of two-dimensional images such as, for example, still images, the frames of a video camera, or two-dimensional images from any other appropriate source.

I. Overview

The method automatically generates the point cloud model of an object in an insitu setting through the use of a two-dimensional images captured by, for example, any of a wide variety of readily available video cameras without any prior knowledge of the camera position, trajectory, velocity, orientation, or optical parameters. Advantageously, these embodiments of the present invention can be practiced with a computer programmed to carry out the processes described below without the need for special cameras or other specialized hardware to process the two-dimensional images.

Essentially, the method uses a two pass process to generate the point cloud model from the two-dimensional images. On the first pass, the method extracts from the two-dimensional images information relative to the camera such as its motion or its optical properties. The motion information includes, but is not limited to, the position, the orientation, or the instantaneous angular velocity of the camera for each two-dimensional image, e.g., frame of a video stream. The optical properties include, but are not limited to, the focal length of the camera lens. On the second pass, the method uses a "ray casting" technique that creates data for the point cloud model on a point-by-point basis based on the derived information relative to the camera, e.g., camera position.

A fundamental assumption behind the ray casting technique is the ability to calculate accurately the "intersection" of two rays in a three-dimensional space. Since the rays are calculated based on discrete pixels in two different two-dimensional images, it is likely that the rays will not have a true intersection, i.e., the rays are not likely to have a common three-dimensional point. Therefore, the determining the "intersection" of two rays for purposes of this specification can consist of finding the points on the two rays that are separated by a minimum distance. This calculation may be accomplished using any conventional or later developed technique. One example of a technique for calculating this "intersection" or minimum distance between two rays is described below with respect to FIGS. 12, 13, and 14.

Once the point cloud is generated, a polygon approximation process can be used to reduce the size of the point cloud data. The polygon count can be reduced even further, as necessary for a particular application, e.g., for use in Internet applications. Further, additional post processing can be used to convert the data to a number of three-dimensional formats for output to VRML for the Internet, computer aided design (CAD) and numerous other applications.

II. One Embodiment of a Method for Generating a Point Cloud Model

The method begins at block 100. The method is described in terms of processing two-dimensional images from a video stream. However, it is understood that the method can also be used to process other types of two-dimensional images, such as, still images or other appropriate two-dimensional images. At block 102, the method receives a video stream. The video stream is a stream of video data that is captured, for example, using a conventional video camera and then digitized into an appropriate digital format. During the capture of the video stream, the video camera is moved relative to the object to be modeled. Ideally, the camera should be moved at a rate that produces an image that is comfortable to view on a monitor.

At block 104, the method identifies and tracks selected features in the video stream. The features can be identified using any appropriate conventional or later developed technique, e.g., using a combination of edge detection and blob analysis routines. Further, the method tracks the features through the sequence of frames in the video stream using, for example, optical flow methodologies, or any other appropriate existing or later developed tracking method. In essence, features in each frame are associated with the same features in other frames of the video stream.

The features are used in later processing steps to provide advantages to the process of generating the three-dimensional point cloud model. For example, in one embodiment, these tracked features provide a basis for deriving the information relative to the camera used to capture the video stream, e.g., the camera position. Further, the tracked features reduce the computational requirements in calculating the three-dimensional voxels of the point cloud as described in more detail below. It is noted that the tracked features used to derive the information relative to the camera may be different from the tracked features used to calculate the three-dimensional voxels of the point cloud model.

At block 106, the method derives a value relative to the camera position or orientation for each video frame. In order to create a three-dimensional model from a series of video images, a value related to the camera position or orientation for each video image must be known. This value is derived from the video stream itself using one of at least two methods.

First, the value related to the camera position or orientation can be derived using structure from motion methodologies. This methodology uses the locations of each feature (e.g., defined by corners of the feature) in each frame to output the location of the camera in {x,y,z} coordinates for each frame. Geometrix, Inc. may be marketing a hardware/software package that could be used to accomplish this functionality. Implementation of structure from motion methodologies is within the level of ordinary skill in the art. It is noted that this technique assumes an orthographic projection, thus introducing significant non-linear distortion in real world applications.

Figure 2:
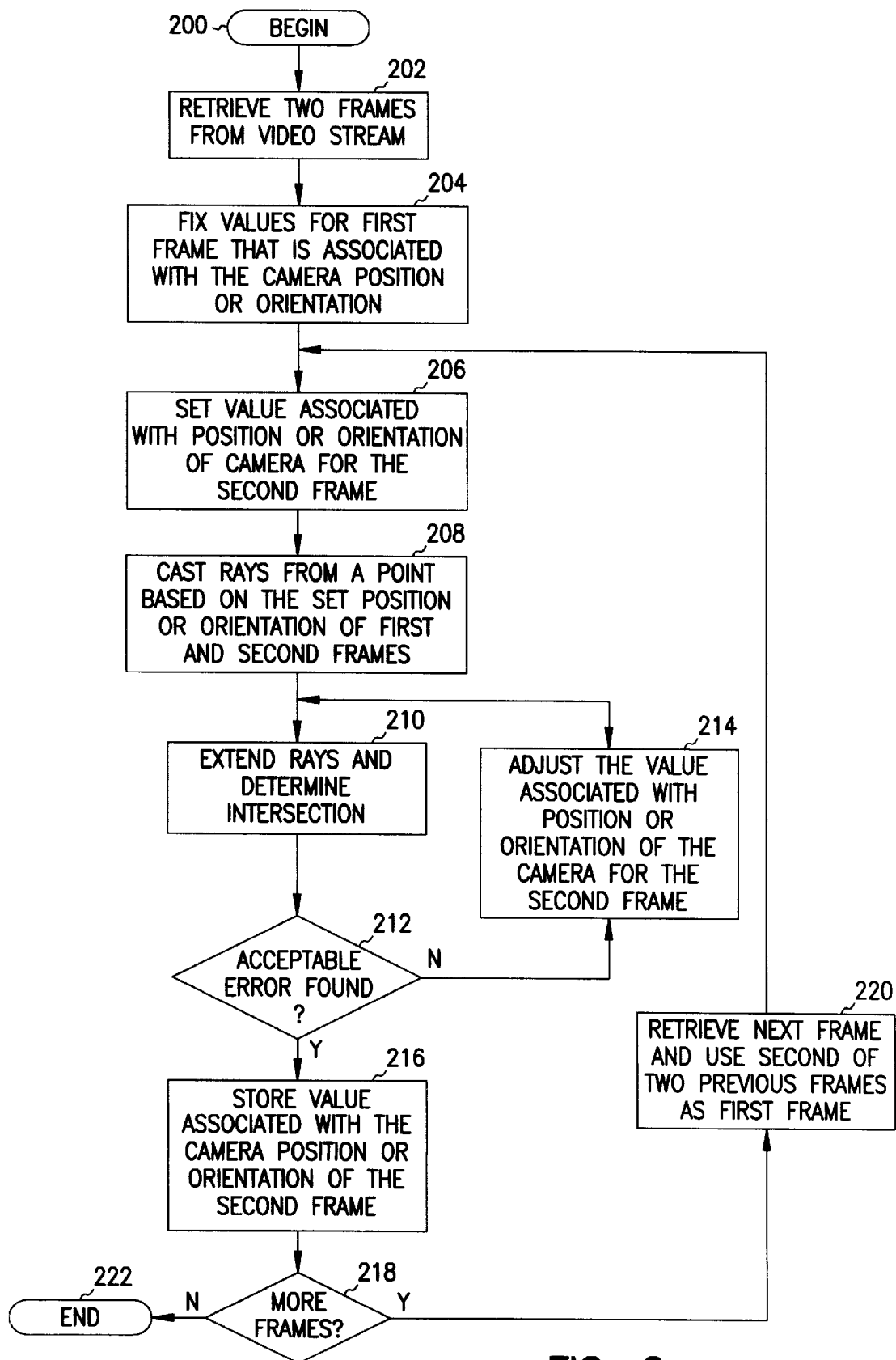
FIG. 2 is a flow chart of one embodiment of a process for deriving a value related to the position or orientation of a camera used to capture two-dimensional images, e.g., a video stream or still images, using ray casting according to the teachings of the present invention.
Figure 3:
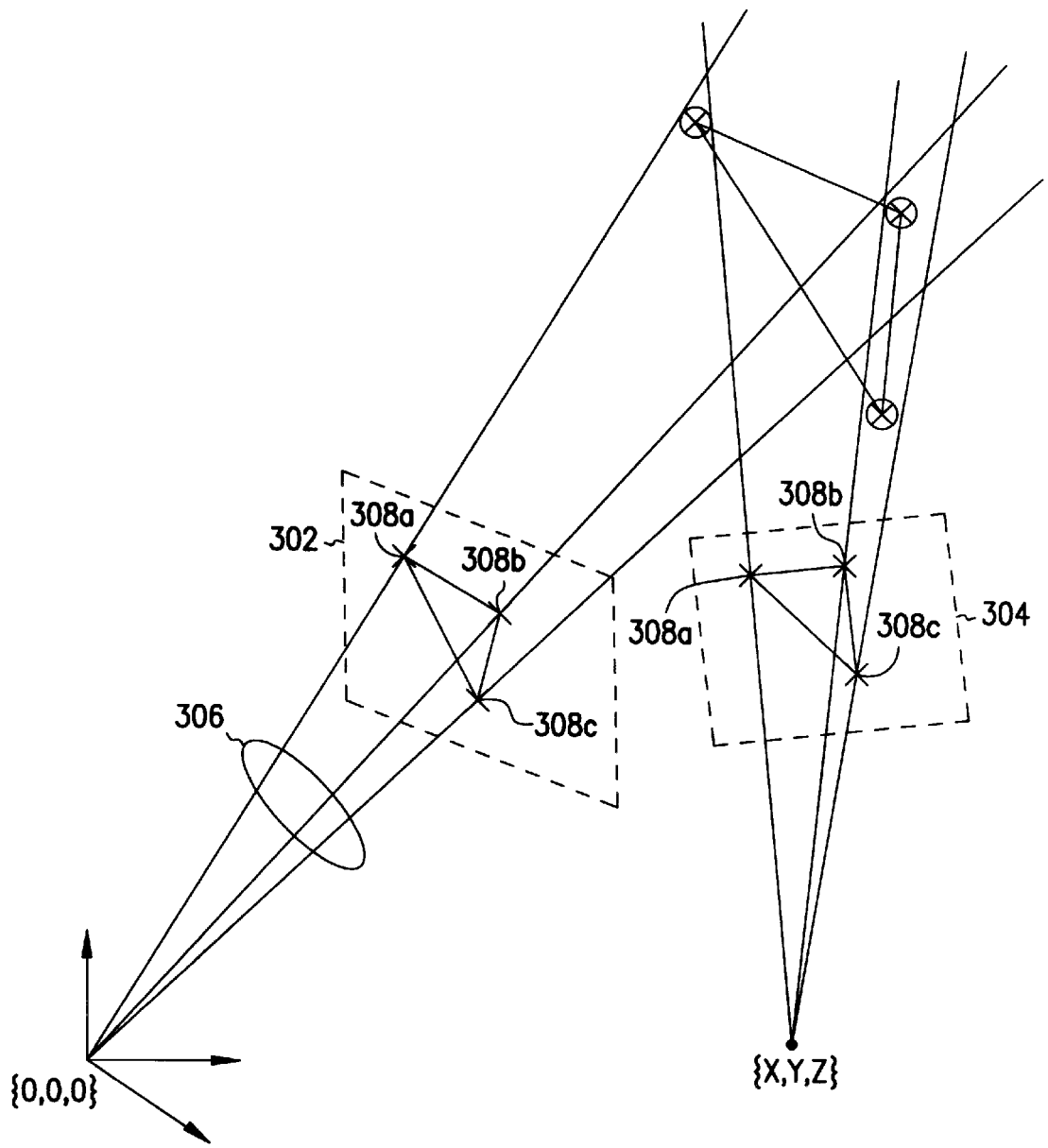
FIG. 3 is a schematic diagram that illustrates the use of ray casting in determining the position of a camera according to the teachings of the present invention.

Alternatively, a value related to the camera position or orientation can be derived using a ray casting technique such as described below with respect to FIGS. 2 and 3 or with respect to FIGS. 8, 9, 10, and 11. However, the method is not limited to the ray casting techniques shown or described with respect to FIGS. 2 and 3 or 8, 9, 10, and 11.

Figure 7:
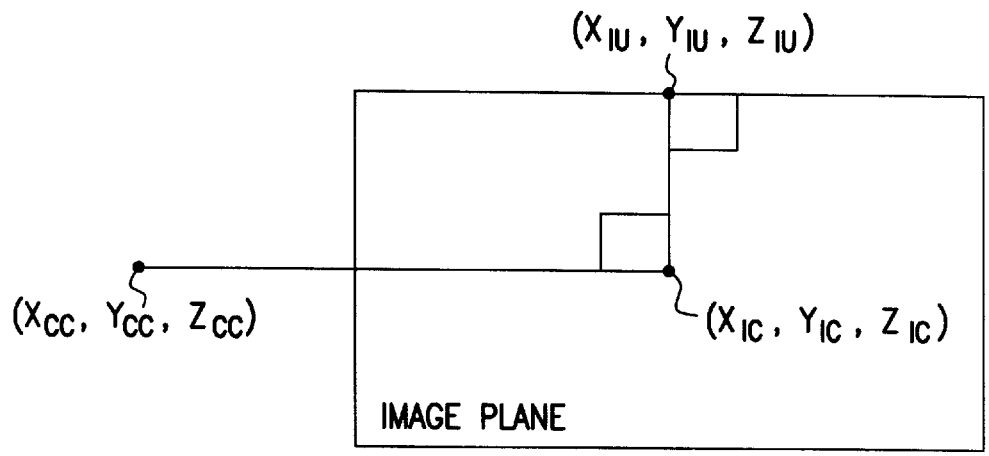
FIG. 7 is a schematic diagram that illustrates an embodiment of a process for defining a value related to the three-dimensional position and orientation of a camera for a two-dimensional image.

In one embodiment, the value associated with the position or orientation of the camera is defined by three points as shown in FIG. 7. In FIG. 7, the position of the camera is defined by a point, e.g., the focal point of the camera ($x_{cc}$, $y_{cc}$, $z_{cc}$,) The orientation of the camera is defined by two additional points in the two dimensional image. For example, these two points may include an image center ($x_{IC}$, $y_{IC}$, $z_{IC}$) that lies in the image along a line normal to the image plane and that passes through the focal point ($x_{cc}$, $y_{cc}$, $z_{cc}$,) The other point that defines the orientation is a point on the image directly above the image center at the top of the image ($x_{IU}$, $y_{IU}$, $z_{IU}$). It is noted that other points or angles can be used to define the position or orientation of the camera for each two-dimensional image. It is further noted that the frames of the video stream are treated as two-dimensional projections in a three-dimensional space. Thus, each pixel of the frame has three-dimensional coordinates that are established relative to the position or orientation of the camera.

Ray casting assumes a pin-hole perspective projection which removes the limitations imposed by perspective distortions which are commonly found in real world scenes thus giving greater accuracy and applicability in the market place. Essentially, in a ray casting technique, the value related to the camera position or orientation is derived based on analysis of sequential frames of the video stream. Rays are cast through selected pixels, e.g., corners, of selected features in each of the sequential frames according to a standard pin hole projection. As a result of this projection, the derived three-dimensional model does not suffer distortions as in existing methods for creating three-dimensional models from two-dimensional images as discussed above. At least four selected pixels should be used for each frame.

Initially, in one embodiment, the camera position and orientation of the first frame is locked down, e.g., with a focal point at the origin, {0, 0, 0}, the image center at {0, 0, 1} and the top of the image at {0, 1, 1}. The position or orientation of the camera for the second of the sequential frames is moved and the intersection of the rays through corresponding features are analyzed to find the position and orientation with the best fit for the second frame.

The rays cast from the camera focal point through the selected pixels of the sequential frames intersect in a three-dimensional space. The position or orientation of the camera for the second frame is determined at an error minimum using a least squares best fit approach for the intersection of each of the rays for the common feature points. Other appropriate techniques can also be used to find an acceptable error level for the intersections that define the camera position or orientation.

This ray casting technique is repeated for additional pairs of sequential frames until the location of the camera is known for a sufficiently large number of frames of the video stream. It is noted that once the first few frames have been processed, the path of the camera is greatly constrained so that the search space for subsequent frames is much smaller.

At block 108, a point cloud of voxels is created using a ray casting technique such as described below with respect to FIGS. 4 and 5. However, the method is not limited to the approach described with respect to FIGS. 4 and 5. The rays are cast based on the value related to the camera position or orientation derived above at block 106. Each ray emanates from the camera position or orientation and passes through the center of one of the pixels of the frame. The number of rays for a frame of a video stream depends on the resolution of the video source. A video source that creates a 400×400 pixel array would have 160,000 rays.

The process essentially looks at the intersection of rays cast through pixels in sequential frames although the intersection of rays cast through non-sequential frames could be used. To limit the computational requirements, the ray casting is accomplished on a feature-by-feature basis. This means that rays through pixels of a selected feature are only compared with rays through pixels of the same feature in another frame.

Rays intersect when two rays match in "quality" within selected bounds and also intersect at a three-dimensional coordinate within a selected bound. For purposes of this specification, the term "quality" means properties of pixel data including, but not limited to, color, intensity, luminance, color gradient, relative position, or other appropriate aspect of the pixel data. One method for using relative position to assist in determining a quality match is described below with respect to FIGS. 15, 16 and 17. For quality, these bounds compensate slight variations in quality from frame to frame based on lighting conditions and camera optics. Further, the bounds for distance account for the fact that pixels of the video frame have discrete positional values and thus rays through a common location on the object might not intersect exactly in the three-dimensional space. When an intersection is detected, the quality and position values of the intersection are averaged and stored as a voxel of the point cloud model. Also, the quality and position values of each ray at the intersection can be stored separately to create a gradient field for increased image quality. Each feature of the sequential frames are processed in this manner.

Additional pairs of frames are similarly processed to develop a complete three-dimensional point cloud. In the three-dimensional point cloud, each point is defined by at least six fields: a three-dimensional location $\{x,y,z\}$ and a quality value such as R, G, and B color values.

At block 110, the data of the point cloud is post-processed. In one embodiment, discretized spatial reduction is used to allow the size of the data to be reduced for specific applications. First, the three-dimensional resolution of the point cloud can be reduced by an N point reduction process. In this process, every N points are averaged for color value. The average of the color value and the center $\{x,y,z\}$ coordinates for the N points are stored in a new, reduced data set. This simply reduces the data set by a factor of N while keeping the relative shape and color patterns the same. Advantageously, the resolution of the three-dimensional model is scalable.

In one embodiment, additional post-processing can be accomplished to convert the point cloud to a format appropriate for computer aided design (CAD), VRML or any other three-dimensional application. This may be accomplished with a polygon conversion or any other appropriate conversion process. In a polygon conversion process, triangular facets are formed from the existing points of the point cloud. Basically, points of the point cloud are grouped together based on proximity. Three points are grouped together as the corners of a triangular facet, with the color of the facet defined as the average or as color gradient of the colors of the corner points. Also, the color of the facet can be defined in many ways, including color per vertex for graphics hardware or mapping a texture onto the polygon. The texture may be defined by interpolating color values between the vertex colors for each pixel in the texture.

Alternatively, in another embodiment, the point cloud can be converted to a polygon based model using a matrix of the voxels of the point cloud. In this process, groups of voxels that make up individual, contiguous surfaces are grouped together. Each group of voxels is replaced with a single polygon. The number of polygons can be reduced using a polygon reduction process. This polygon model can then be exported into an appropriate format such as VRML. This polygon conversion process has been demonstrated in multiple commercial implementations.

The method ends at block 112.

Advantageously, the resolution of the three-dimensional point cloud model may be greater than the resolution of the source charge coupled device (CCD) used to create the video stream. Sub-voxel data may be interpolated through the inherent nature of how the voxel data is stored—linear color gradient interpolation. As subsequent intersecting rays are calculated, the intersection geometry is actually a minimal length line between the rays rather than an actual point for the majority of the rays. These lines are composed of separate color values for the endpoints of the line with the midpoint on the line representing the approximate true intersection point of the rays. By dealing with the intersection points as a gradient along a line, sub-voxel resolution is generated. The larger number of intersection points calculated yields a higher resolution for the model than for the video source. Through this process, a video camera with a 512×384 pixel resolution is able to capture surface texture resolution many orders of magnitude larger than each individual frame. For example, 100 frames of 512×384 frames (196,608 pixels per frame) yields a maximum of 19,660,800*N voxels possible with subpixel improvement of N increments. The resolution and subdivision are limited only by the color bit depth of the source data.

A further advantage of the present method is its reduced distortion compared with conventional approaches. Conventional approaches create only the shape of the object onto which two-dimensional images are mapped. Embodiments of the present invention deal with data on pixel-to-pixel basis and track each pixel in the images of the object rather than a few control pixels. Further, the true color data is stored within the voxel data set. This allows for the most accurate texture to shape correlation possible with no distortions in the textures of the resulting model. Thus, there is no post-processing texture mapping which could lead to distortion in the three-dimensional model.

Another advantage of the present invention over classical shape from motion solutions is that it works with real world perspective. It does not use an orthographic projection and is therefore more flexible in the types of environments and objects which may be converted and is in general more accurate in the models which are output.

III. One Embodiment of a Method for Deriving a Value Related to Position or Orientation FIG. 2 is a flow chart of an embodiment of a process for deriving a value related to the position or orientation of a camera used to capture two-dimensional images, e.g., a video stream or still images, using ray casting according to the teachings of the present invention. The method begins at block 200. The method of FIG. 2 is described in terms of processing a "video stream." However, it is understood that the method can also process two-dimensional images from other sources, such as, two-dimensional still images or other appropriate two-dimensional images. At block 202, two frames of the video stream are retrieved. In one embodiment, the frames are sequential frames of the video stream. FIG. 3 is a schematic diagram that illustrates the use of ray casting in determining the value associated with the position or orientation of a camera according to the process of FIG. 2. FIG. 3 shows representative frames 302 and 304 of a video stream.

An initial value related to the position or orientation of the camera for each frame is established. At block 204, a value associated with the camera position or orientation for the first of the two video frames is fixed at a selected value. For example, the value associated with the camera position or orientation for video frame 302 is set at {0,0,0}. This value can be treated as a focal point for the camera and is thus related to the position or orientation of the camera. An arbitrary focal length can be selected. At block 206, the value related to the position or orientation of the camera for frame 304 is set at an initial value represented arbitrarily as {x, y, z} in FIG. 3.

Next, the accuracy of the selected value associated with the position or orientation of the camera for frame 304 is tested. At block 208, rays 306 are cast from a point based on the set position or orientation through selected features 308a, 308b, and 308c of the frames 302 and 304. In this example, rays are cast through the corner pixels of the selected feature. It is noted that in a practical application, additional features and pixels can be used to improve the accuracy of the process. At block 210, the method extends the rays and determines the intersections of the rays through associated pixels of the first and second frames. Intersections are determined based on, for example, positional and quality information. At block 212, the method determines whether an acceptable error value has been found, e.g., a minimum error using a least squares best fit approach. Thus, decisional block 212 is not limited to identifying the first occurrence of an error value within a specified range. Rather, block 212 can determine when the position or orientation has been adjusted to a point that the error is at a minimum. If the error is not acceptable, the method proceeds to block 214 and adjusts the value related to the position or orientation of the camera for the second of the two frames and repeats the process of blocks 210, and 212.

When at block 212, the method determines that the error is acceptable, the method stores the camera position or orientation for the second frame at block 216.

At block 218, the method determines whether additional frames need to be processed. If not, the method ends at block 222. If additional frames need to be processed to determine a value associated with the position or orientation of the camera, then the method proceeds to block 220. At block 220, the method retrieves another frame from the video stream, e.g., the next sequential frame. The method then returns to block 206 and processes the new frame with the second frame of the previous iteration. In this case, the second frame from the previous iteration is treated as the first frame with its value associated with the position or orientation of the camera being locked in at the position or orientation stored at block 216.

This process is repeated until all frames have been processed so that a value associated with the position or orientation of the camera is derived for each frame of the video stream.

IV. One Embodiment of a Method for Creating Three-Dimensional Voxels

Figure 4:
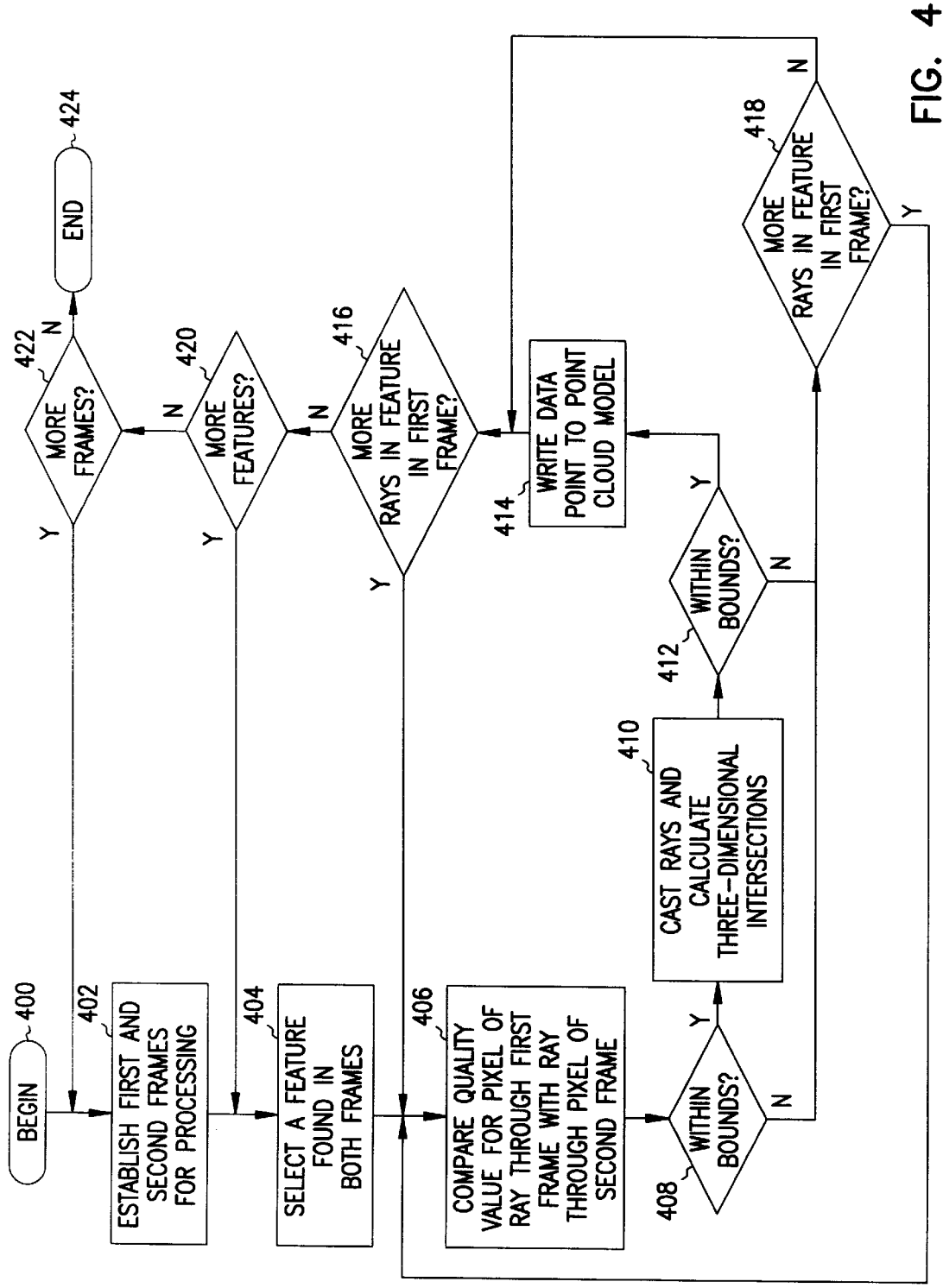
FIG. 4 is a flow chart of one embodiment of a process for creating voxels for a three-dimensional model from two-dimensional images, e.g., a video stream or still images, using ray casting according to the teachings of the present invention.

FIG. 4 is a flow chart of a process for creating voxels for a three-dimensional model from a two-dimensional images, e.g., a video stream, still images, or other appropriate two-dimensional images, using ray casting according to the teachings of the present invention. The method of FIG. 4 is described in terms of processing a video stream. However, it is understood that the method of FIG. 4 can be used to process two-dimensional images from other sources such as still images or other appropriate two-dimensional images. The method begins at block 400 and processes the video stream in pairs of video frames.

Figure 5:
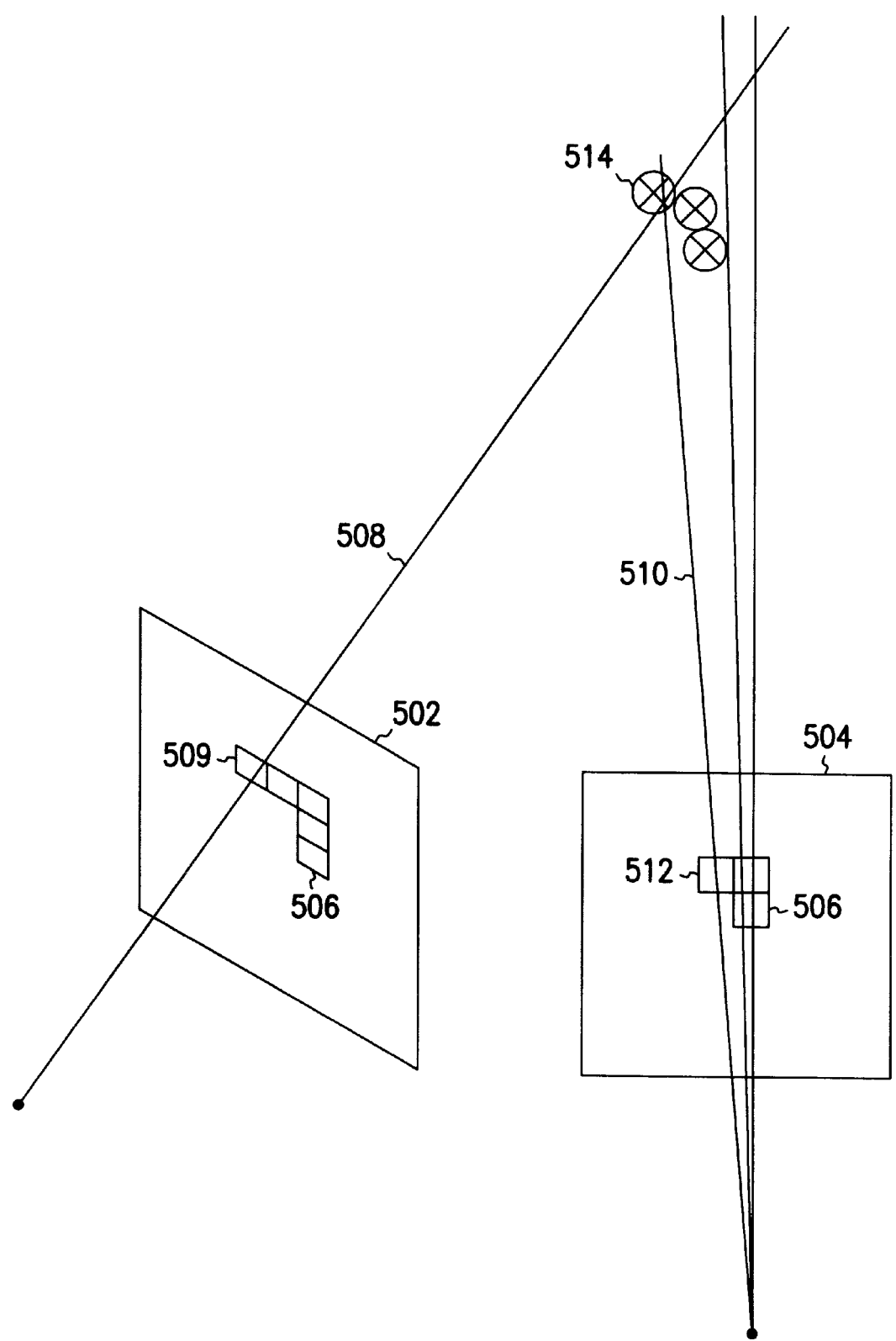
FIG. 5 is a schematic diagram that illustrates the use of ray casting in creating voxels for a three-dimensional model from two-dimensional images, e.g., a video stream or still images, according to the teachings of the present invention.

FIG. 5 is included to aid in the description of the process of FIG. 4. FIG. 5 is a schematic diagram that illustrates the use of ray casting in creating voxels for a three-dimensional model from a video stream.

At block 402, the method established first and second frames for processing. In FIG. 5, these frames are represented by frames 502 and 504. Frames 502 and 504 may be sequential frames in the video stream. For each frame, a value associated with the position or orientation of the camera was established previously. Each frame contains a number of features that are associated with features of the other frame. For example, frames 502 and 504 each contain a representation of feature 506. To reduce the computational requirements of the process, the ray casting is accomplished on a feature by feature basis. Thus, at block 404, a feature that is found in both frames is selected, e.g., feature 506 of FIG. 5.

Beginning at block 406, the method determines intersections of rays cast through pixels of feature 506 in frames 502 and 504. At block 406, the method compares the quality value for the pixel 509 associated with ray 508 with the quality value of pixel 512 associated with ray 510. At block 408, the method determines whether the quality values match within selected bounds. If the quality values match within the selected bounds, the method casts rays and calculates the three-dimensional intersection at block 410. At block 412, the method determines whether the three-dimensional intersection falls within selected bounds. If the intersection falls within the selected bounds, then the method proceeds to block 414 and writes a data point to the point cloud, e.g., data point 514. Each data point consists of six fields: the x, y, and z coordinates, and the R, G, and B values. These values may be the average of the values for the rays 508 and 510 at the intersection or some other appropriate representation of each individual data set. For example, some of the storage types possible for a voxel include, but are not limited to: 12 fields representing the endpoints of a minimum distance line between the two rays stored as $\{(x_1,y_1,z_1,)$ and $(R_1,G_1,B_1,)\}$ for the first endpoint and as $\{(x_2,y_2,z_2)$ and $(R_2,G_2,B_2)\}$ for the second endpoint, seven values representing the sphere around the minimum distance line between the two rays with a radius set by the error points used at the solution point stored as a center point $\{(x, y, z) (R, G, B)$ and radius r$\}$, or other appropriate storage types. The method determines at block 416 whether there are more rays for the feature in the first frame to be processed. If so, the method returns to block 406 to determine additional intersections.

If at block 408 or block 412 the method determines that the intersection is not within the quality value or dimensional bounds, then the method proceeds to block 418. At block 418, the method determines whether there are more rays in the feature in the second frame to compare with the ray of the first frame. If there are more rays in the feature in the second frame, the method returns to block 406 to continue the search for intersections. If not the method proceeds to block 416 and determines if there are more rays in the feature in the first frame to be processed as described above.

If at block 416, the method determines that there are no more rays in the first frame to be processed, then the method proceeds to block 420 and determines whether there are more features in common between the first and second frames. If there are more common features, the method proceeds to block 404 and begins the processing of the next common feature. If there are no more common features, then the method proceeds to block 422 and determines whether all of the frames have been processed. If the method determines that there are more frames, the method proceeds to block 402 and processes another pair of frames. If the method determines that all of the frames have been processed, then the method ends at block 424.

Each of the described embodiments are implemented, for example, using a programmed computer. For example, the methods described above can be implemented on a personal computer using an application program or software code written in C++ language to carry out the processes described below. It is understood that other machines can be programmed using other appropriate languages to accomplish these methods within the scope of the present application. Alternatively, the methods described herein could be built in hardware rather than software for increased ability to allow real-time processing. In addition, due to the iterative approach, the described methods can be implemented even in software for real-time applications as speeds of microprocessors continue to increase.

V. One Embodiment of A System for Creating Three-Dimensional Models

Figure 6:
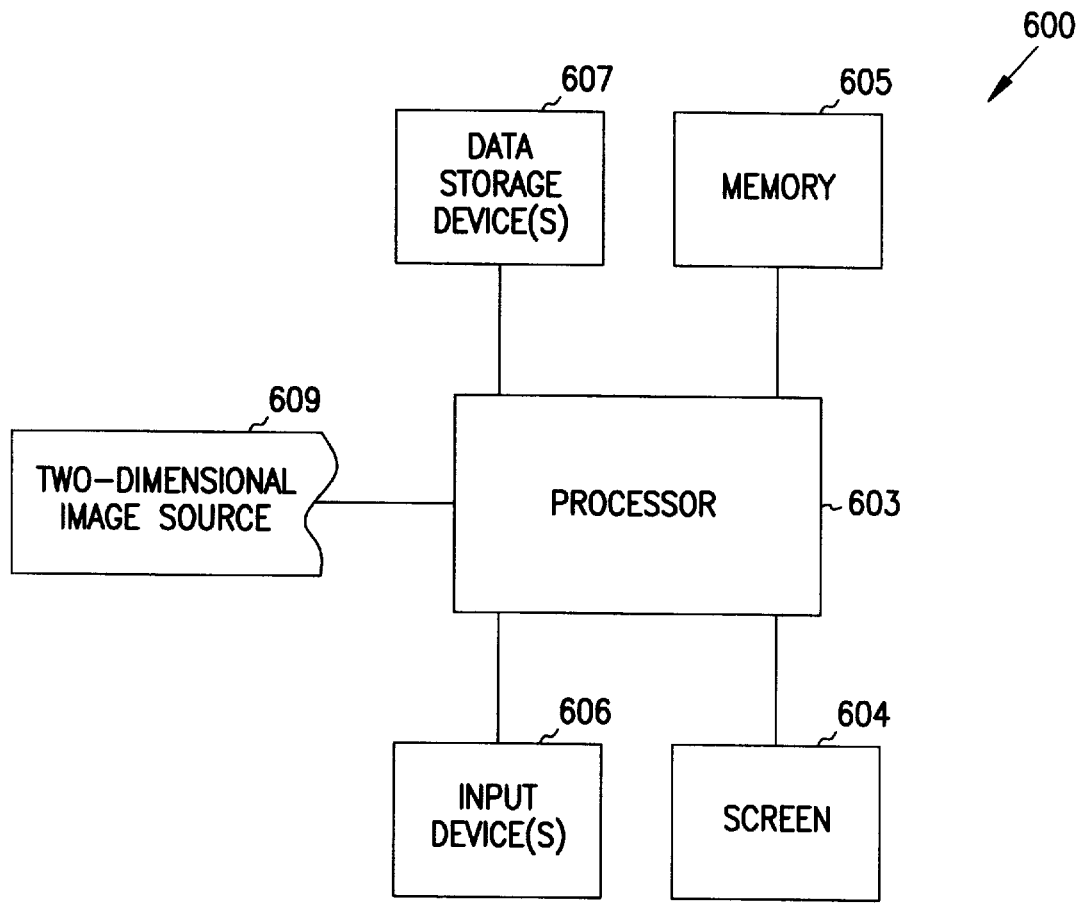
FIG. 6 is a block diagram of an embodiment of a system for creating a three-dimensional model from two-dimensional images, e.g., a video stream or still images, according to the teachings of the present invention.

FIG. 6 is a block diagram of an embodiment of a system for creating a three-dimensional model from two-dimensional images, e.g., a video stream, still images, or other appropriate two-dimensional images, according to the teachings of the present invention. System 600 is a microprocessor based computer. Computer 600 includes processor 603 such as a Pentium processor from Intel Corporation. Processor 603 is coupled to memory 605, and data storage device(s) 607 (e.g., hard disk drive, floppy disk drive, CD ROM or other appropriate computer readable medium). The computer uses an operating system such as Windows 95 from Microsoft Corporation or other appropriate operating system. Processor 603 is further coupled to screen 604, input devices 606 and two-dimensional image source 609. Source 609 comprises, for example, a video camera with a digital encoder to provide a digital stream of video data. Alternatively, video source 609 comprises other appropriate sources of two-dimensional images such as a digital camera, scanner, etc.

Input device(s) 606 includes, for example, a key pad, keyboard, mouse, touch screen, serial port or other device for providing inputs to processor 603. Storage device(s) 607 stores program code for executing instructions to implement one or more of the methods described above to create a three-dimensional point cloud from two-dimensional images, e.g., a video stream, provided by source 609.

Figure 8:
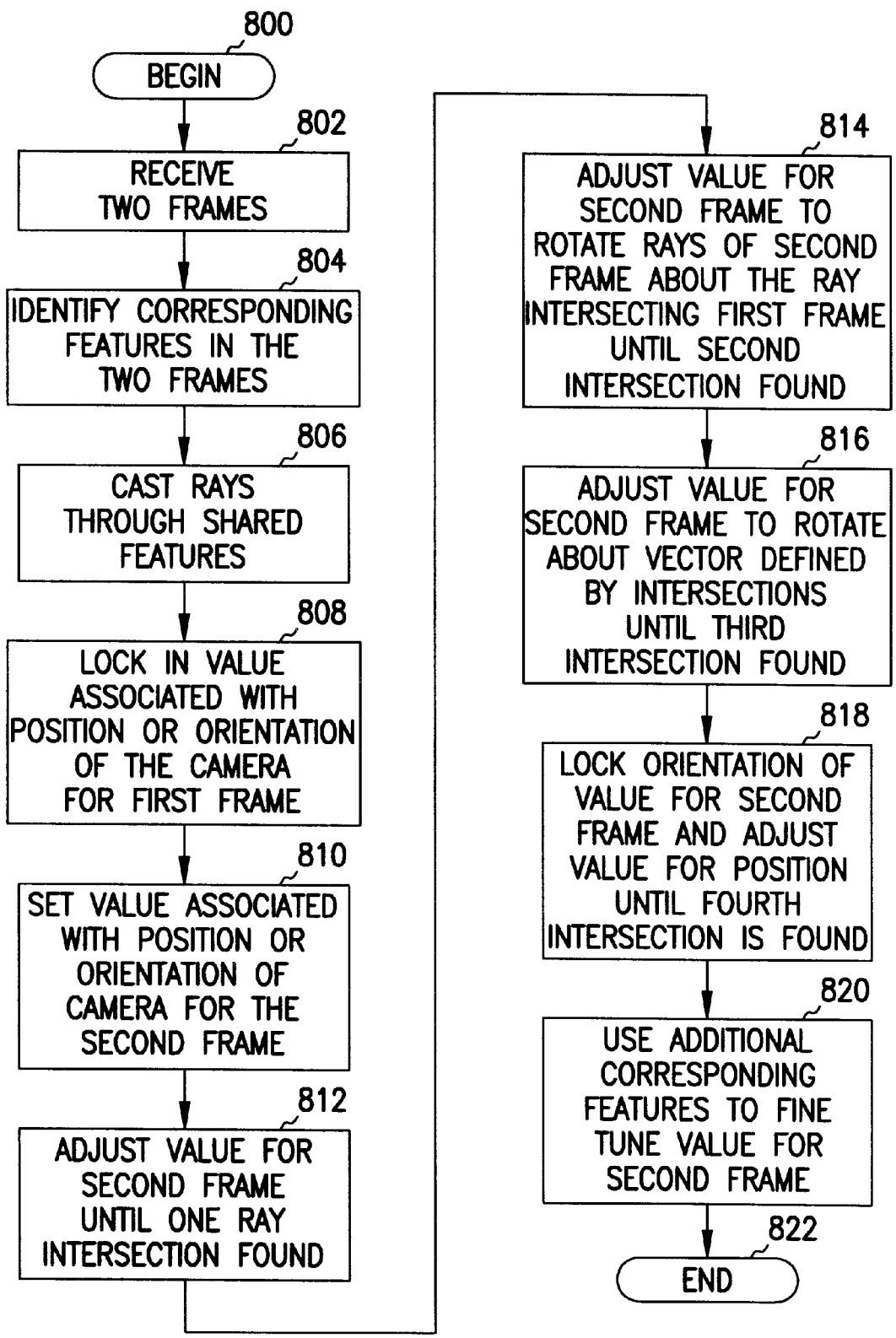
FIG. 8 is a flow chart that illustrates another embodiment of a process for deriving a value related to the position or orientation of a camera used to capture two-dimensional images, e.g., a video stream or still images, using ray casting according to the teachings of the present invention.

VI. Another Embodiment of a Method for Method for Deriving a Value Related to Position or Orientation FIG. 8 is a flow chart that illustrates another embodiment of a process for deriving a value related to the position or orientation of a camera used to capture two-dimensional images, e.g., a video stream or still images, using ray casting according to the teachings of the present invention. The method of FIG. 8 is described in terms of processing a "video stream." However, it is understood that the method can also process two-dimensional images from other sources, such as, two-dimensional still images or other appropriate two-dimensional images.

Figure 9:
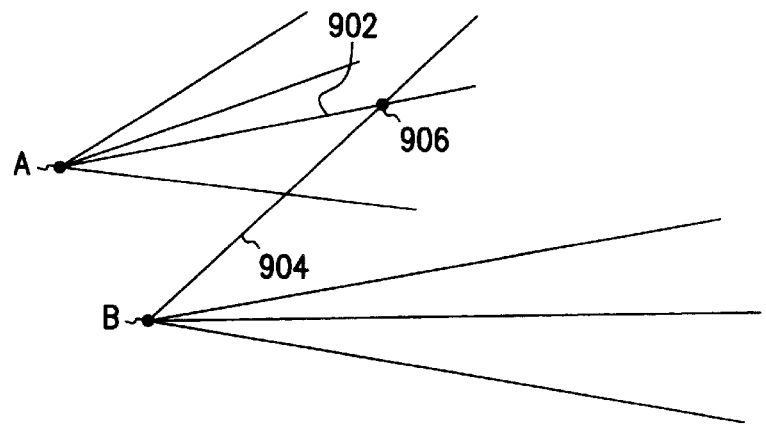
FIGS. 9, 10, and 11 are schematic diagrams that illustrates the use of ray casting in determining the position of a camera according to the teachings of the present invention.
Figure 10:
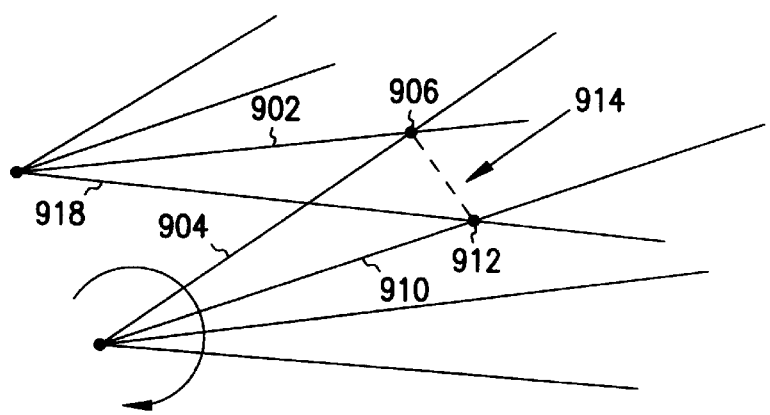
Figure 11:
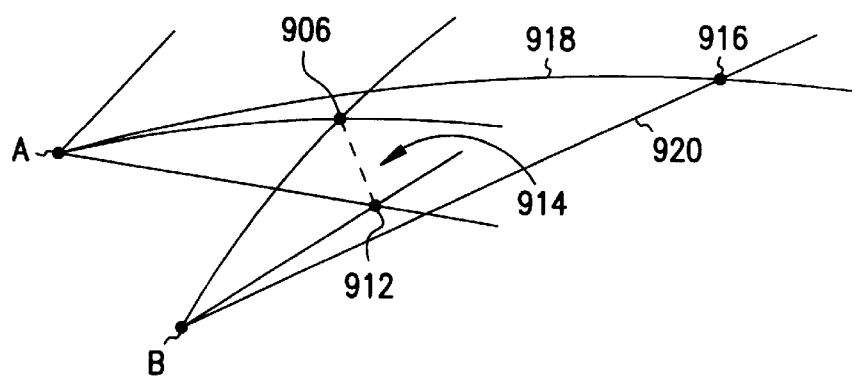

The method begins at block 800. At block 802, two frames of the video stream are retrieved. In one embodiment, the frames are sequential frames of the video stream. FIGS. 9 through 11 illustrate various rays that are cast through the two frames to find the value related to the camera position or orientation for the second frame. Point A represents the focal point for the camera position for the first frame and point B represents the focal point for the camera position for the second frame.

At block 804, the method identifies corresponding features in the two frames and casts rays through the features at block 806. At block 808, the value associated with the position or orientation of the camera for the first frame is locked in with the focal point A at the origin. At block 810, the method sets the value associated with the position or orientation of the camera for the second frame at an initial guess. This value is adjusted at block 812 until one ray intersection is found. For example, as shown in FIG. 9, ray 902 from point A through the first frame intersect with ray 904 from point B through the second frame intersect at point 906.

At block 814, the value for the second frame is adjusted again. This time, the value is adjusted such that the rays from point B rotate around the ray from point B that intersects one of the rays from point A until a second intersection is found. For example, the value for the second frame is adjusted so that its rays rotate around ray 904 until ray 908 intersects with ray 910 at point 912 as shown in FIG. 10. Intersection points 906 and 912 define a vector 914 that is used in subsequent processing.

At block 816, the value for the second frame is adjusted again. This time, the value is adjusted such that the rays from point B rotate about the vector defined by the two intersection points, e.g., about vector 914, until a third intersection point is identified. For example, as seen in FIG. 11, the value for point B is adjusted until ray 916 intersects ray 918 at point 920. With these three intersections identified, the camera orientation for the second frame is established, e.g., the location of focal point B. This value is locked in at block 818 and then the position values are adjusted again until a fourth intersection is found. This fourth intersection defines the position and orientation of the camera for the second frame. At block 820, additional common features can be used to fine tune the position and orientation of the camera for the second frame using a best-fit optimal search process that finds the minimum error for all feature points. This is accomplished with small adjustments to the position or orientation points for the second frame.

The method ends at block 822.

The method of FIG. 8 can then be used to process subsequent frames. In this subsequent processing, the second frame from the previous pass through the process is used as the first frame and a new frame is retrieved to be the second frame during the next pass through the process. The position or orientation derived by the process of FIG. 8 for the second frame on the previous pass through the process is locked in as the value associated with the position or orientation of the camera at block 808 for the first frame.

Figure 12:
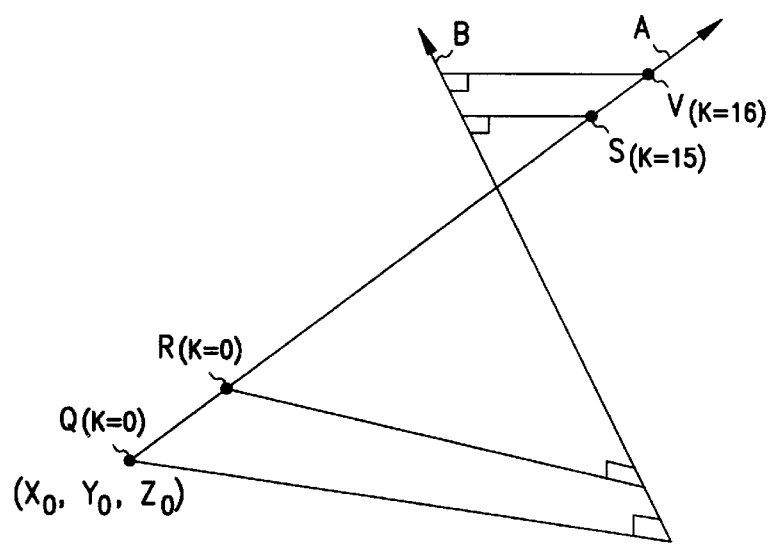
FIGS. 12, 13, and 14 are graphs that illustrate an embodiment of a process for determining the three-dimensional location of an intersection of two three-dimensional rays.
Figure 13:
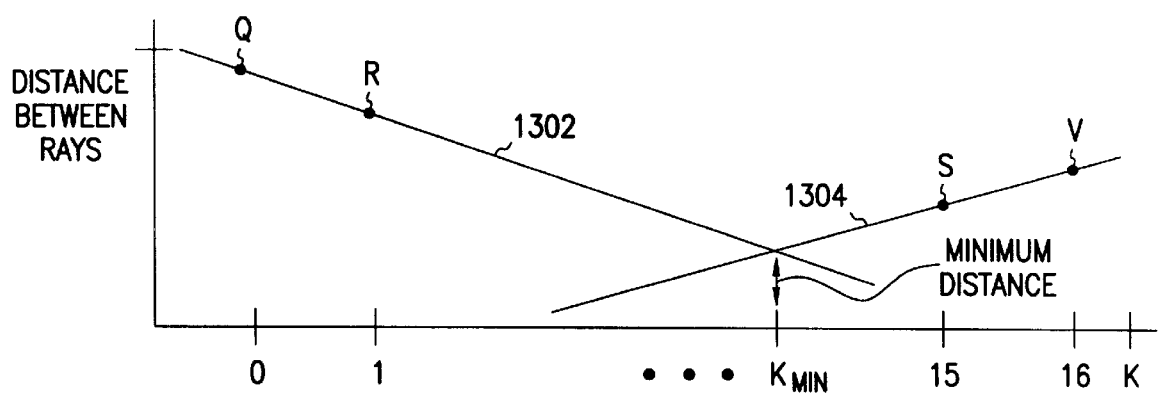
Figure 14:
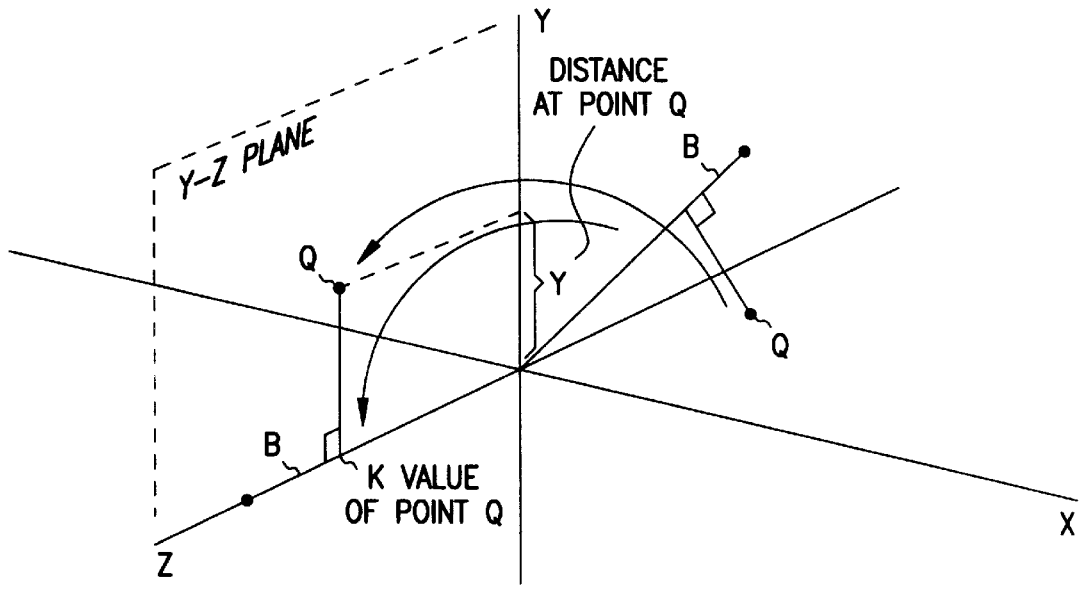

VII. One Embodiment of a Process for Determining the Three-Dimensional Location of the Intersection of Two Three-Dimensional Rays FIGS. 12, 13, and 14 are graphs that illustrate an embodiment of a process for determining the three-dimensional location of an intersection of two three-dimensional rays. This method determines the "intersection" as the minimum distance between the two rays. Because the rays are cast through discrete pixels, the rays may not have an exact point of intersection, however, the rays will pass each other at some minimum distance. The points along these two rays that are separated by this minimum distance are, then, used to define the intersection as described above.

This section provides one method to find the points on the ray that are separated by the minimum distance. According to this method, the rays are defined by a parametric relationship. That is each ray is formulated by the equations:

$$X = K*X_1 + X_0$$

$$Y = K*Y_1 + Y_0$$

$$Z = K*Z_1 + Z_0$$

In these equations, the value K is a scalar multiplier. The coordinates $(X_0, Y_0, Z_0)$ are the coordinates of the starting point of the ray, e.g., the focal point of the camera for a frame of the video stream. And, the coordinates $(X_1, Y_1, Z_1)$ represent a unit vector in the direction of the ray having its origin at the coordinates $(X_0, Y_0, Z_0)$.

Four points along one of the rays defined by this parametric relationship are used to calculate the minimum distance. Two points are selected along the ray on each side of the point on the ray associated with the minimum distance. Then, the distance between these four points and the other ray are calculated. These four points, along with their distances from the other ray can then be used to calculate the point on each ray associated with the minimum distance between the rays.

As shown in FIG. 12, four points, Q, R, S and V are defined along ray A. Points Q and R are located on one side of the "intersection" and points S and V are located on the other side of the intersection. Once the four points are selected, the distance from the four points to ray B are calculated. This can be accomplished using the technique shown in FIG. 14. According to this technique, the ray B is manipulated through a series of rotations to lie along a coordinate axis, e.g., the Z-axis. The coordinates of the point being investigated, e.g., points Q, R, S, and V are similarly rotated. The points Q, R, S, and V, are then rotated into one of the planes, e.g., the Y-Z plane, such that one of the coordinates, e.g., the Y value, of the point is the distance from ray B. The Z value is determined based on the K scalar value of the point. The essence of this technique is that the ray and the point are manipulated in a fixed relation to one another such that the ray and the point lie in the same plane. Thus, it is not necessary that the ray be rotated to be placed along the coordinate axis or that the point be placed into one of the X-Y, Y-X, of X-Z planes.

To find the minimum distance, the four points are graphed as shown in FIG. 13. In this graph, the derived distance is plotted along one axis and the value of K is plotted along the other axis. This forms two lines, 1302 and 1304. The two lines intersect at a value of K, $K_{MIN}$, that represents the point of minimum distance between the two rays. The value for $K_{MIN}$ for the other ray can be determined using this same approach.

Figure 15:
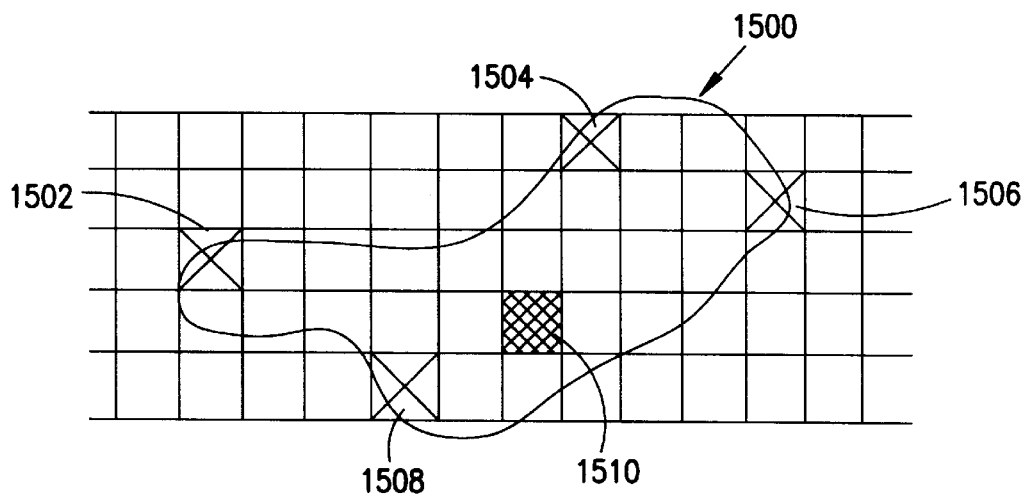
FIGS. 15 and 16 are schematic diagrams that illustrate an embodiment of determining ray intersections according to the teachings of the present invention.
Figure 16:
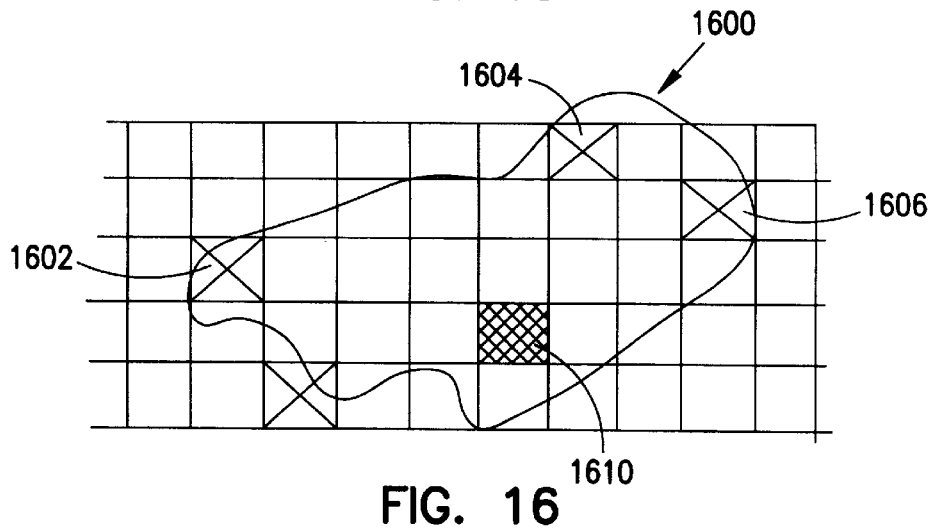
Figure 17:
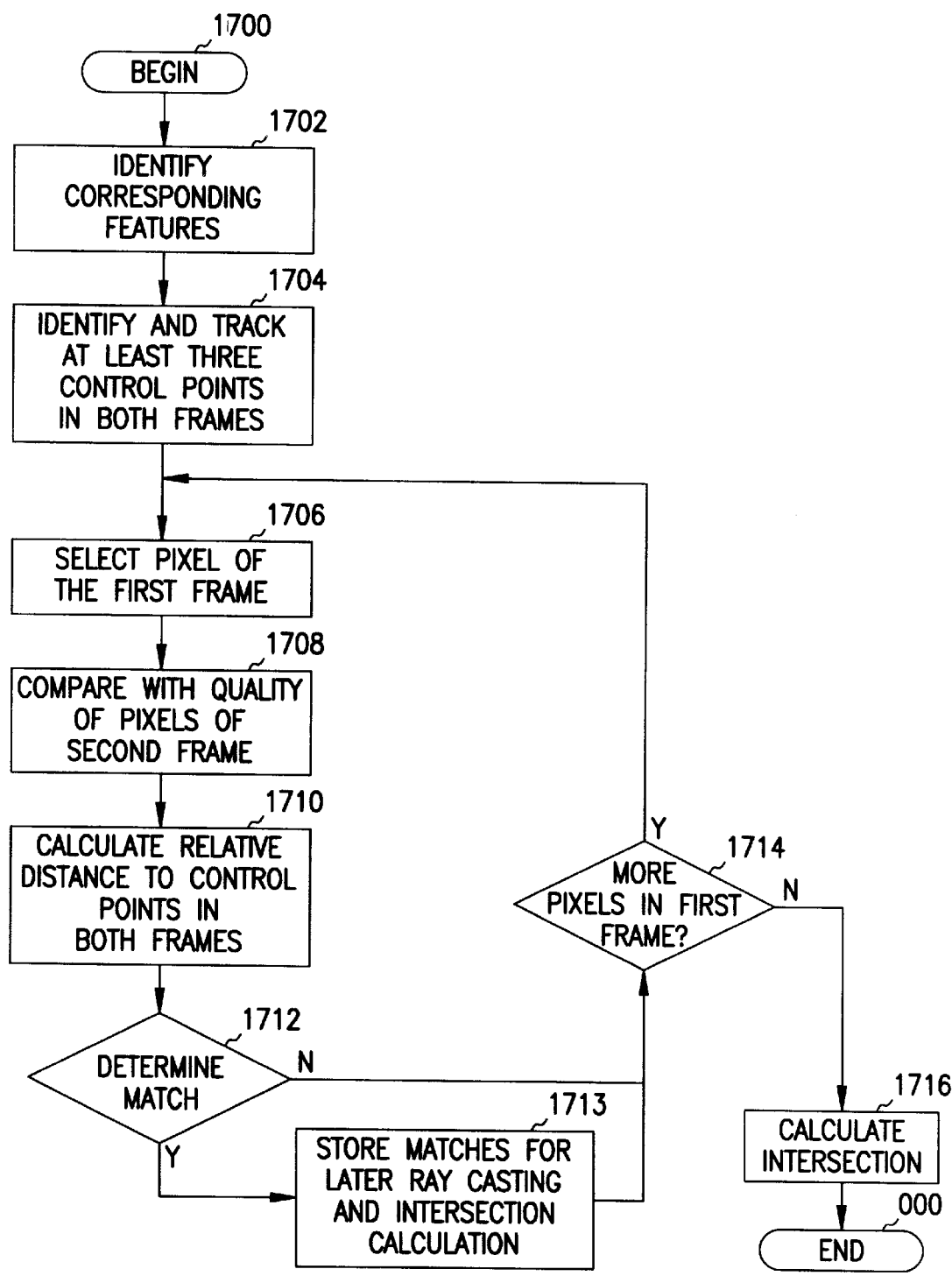
FIG. 17 is a flow chart of an embodiment of a process for determining the intersection of two rays using the relative position of pixels in common features of first and second frames according to the teachings of the present invention.

VIII. One Embodiment of Process for Identifying Ray Intersections Including Use of Relative Position FIGS. 15 and 16 are schematic diagrams that illustrate an embodiment of a method for determining ray intersections according to the teachings of the present invention. To reduce the number of calculations that are necessary when looking for intersections of rays cast through common features of first and second frames, the method attempts to use the relative position of pixels in the two frames. In other words, if a correlation between the pixels of the common feature in the two frames can be derived, then this correlation can be used to greatly reduce the computational burden of the method. Optimally, this would provide that each pixel in the first frame would correspond to only one pixel in the second frame. The method of FIG. 17 provides an embodiment that approaches this one-to-one pixel correspondence on a feature-by-feature basis. FIGS. 15 and 16 are graphical representations of a feature in first and second frames, respectively.

The method begins at block 1700. At block 1702, corresponding features in first and second frames are identified, e.g., features 1500 and 1600 for the first and second frames, respectively. Within each feature, at least three control points are identified and tracked between the frames at block 1704. For example, four control points, 1502, 1504, 1506, and 1508 of frame 1500 are associated with corresponding control points 1602, 1604, 1606, and 1608 of frame 1600.

At block 1706, the method begins the process of determining an intersection based on qualities of the pixels, including, in this case, the relative distances of the pixels to a number of control points. At block 1706, the method selects a pixel of the first frame, e.g., pixel 1510. At block 1708, the method compares qualities other than relative distance, e.g., color, luminance, etc., with the pixels of the second frame. At block 1710, the method calculates the relative distance to the control points from the pixels of both frames. And, at block 1712, the method determines the match to be the pixel(s), e.g., pixel 1610, with the relative position that is closest to the relative position of the pixels in the first frame that also matches the other qualities. If the pixels match, the method stores the matches for later ray casting and intersection calculation at block 1713 and proceeds to block 1714. If the pixels do not match, the method proceeds to block 1714.

At block 1714, the method determines whether there are additional pixels in the first frame. If there are additional pixels, the method returns to block 1706. If not, the method proceeds to block 1715 and calculates the ray intersection. The method ends at block 1716.

Advantageously, by calculating and using this relative distance on a pixel-by-pixel basis, it is possible to come near to a one-to-one correlation between pixels of the first and second frames within the feature. This correlation gives the optimal calculation complexity for the ray casting technique and also reduces the error within the point cloud model of the surface.

Conclusion

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the method may process pairs of non-sequential frames in determining the value associated with the location of the camera or the voxels of the point cloud model.

Further, quality values other than 24 bit color values can be used. It is noted that the phrase "position or orientation" as used herein is intended to cover position, orientation or position and orientation. Further the minimum distance between two rays can be calculated by other known or later developed relationships that calculate the distance between the two rays at various points along the rays. Further, it is understood that the two-dimensional images can be captured using more than one camera or other imaging device.

What is claimed is:

1. A method for creating a three-dimensional model of an object, the method comprising:

receiving a number of two-dimensional images of the object;

tracking the location of a plurality of features through the two-dimensional images;

storing the locations for the plurality of features;

deriving a value related to a camera position or orientation for each of the two-dimensional images from the stored locations for the plurality of features; and for each of the plurality of features, processing a plurality of pairs of two-dimensional images to create a point cloud model, the processing including:

casting a ray through each pixel in the feature in each of first and second two-dimensional images of a pair of two-dimensional images based on the value relative to the camera position or orientation and the pixel location in each of the first and second two-dimensional images, determining the intersections of the rays of the first two-dimensional image with the rays of the second two-dimensional image, creating a voxel for a three-dimensional point cloud model at each intersection, and converting the point cloud to a polygon-based format.

2. The method of claim 1, wherein receiving a number of two-dimensional images comprises receiving a video stream recorded with a video camera while moving the camera with respect to the location of the object.

3. The method of claim 1, wherein tracking the location of a plurality of features through the two-dimensional images comprises using edge detection to identify features and optical flow analysis to track the features through the two-dimensional images.

4. The method of claim 1, wherein deriving a value related to the camera position or orientation comprises using a structure from motion technique.

5. The method of claim 1, wherein deriving a value related to the camera position or orientation comprises using ray casting for sequential two-dimensional images in an iterative process.

6. The method of claim 1, wherein deriving a value related to the camera position or orientation comprises:

finding a first intersection of rays through one of the tracked feature of the first and second images;

adjusting the value related to the camera position or orientation for the second image so as to rotate the rays through the selected features about the intersecting ray to find a second intersection of rays through selected features of the first and second images;

adjusting the value related to the camera position or orientation for the second image so as to rotate about a vector formed by the first and second intersection points to find a third intersection of rays through selected features of the first and second images;

adjusting the value related to the camera position for the second image so as to find a fourth intersection.

7. The method of claim 6, and further refining the camera position and orientation values using best fit technique.

8. The method of claim 7, wherein comparing the quality values includes:

establishing control points for a feature of the first and second images;

calculating relative distances from each pixel to the control points in the first and second images; and using the relative distances to determine a quality match.

9. The method of claim 1, wherein determining the intersections comprises:

comparing the quality values of the pixels associated with the rays through the first and second two-dimensional images; and when the quality values fall within a selected bound, determining whether the rays intersect within a second, selected bound.

10. The method of claim 1, wherein determining the intersections comprises, for pairs of first and second rays:

representing the rays parametrically; and analyzing the distance between the first ray and points on either side of the intersection of the second ray.

11. The method of claim 10, wherein analyzing the distance comprises rotating:

rotating the first ray to place it along an axis of a three-dimensional coordinate system;

rotating the points of the second ray to place them in a plane of the three-dimensional coordinate system; and setting the distance for each point equal to one of the coordinate values of the point.

12. The method of claim 1, wherein determining the intersections includes comparing color values.

13. The method of claim 1, wherein creating a voxel comprises averaging the location and quality value data for the intersecting rays and storing this data as a voxel for the point cloud model.

14. The method of claim 1, wherein creating a voxel comprises storing separately the values for the two intersecting rays to create a gradient field.

15. The method of claim 1, wherein creating a voxel comprises creating a sphere around a minimum distance line between the intersecting rays with a radius set by the error.

16. The method of claim 1, wherein the value related to the camera position and orientation comprises a focal point, an image center point and an image top point.

17. A method for creating a three-dimensional model of an object, the method comprising:

receiving a number two-dimensional images of the object;

tracking the locations of a plurality of features through the two-dimensional images;

deriving a value related to a three-dimensional camera position or orientation for each two-dimensional image from the locations for the plurality of features;

creating a plurality of voxels to define the three-dimensional model based on intersections of a plurality of rays that are cast through the pixels of each two-dimensional image using the value related to the three-dimensional camera position or orientation and the feature locations; and converting the point cloud to a polygon-based format.

18. The method of claim 17, wherein receiving a video stream comprises recording with a video camera while moving the camera with respect to the location of the object.

19. The method of claim 17, wherein tracking the location of a plurality of features through the two-dimensional images comprises using edge detection to identify features and optical flow analysis to track the features through the two-dimensional images.

20. The method of claim 17, wherein deriving a value related to a three-dimensional camera position or orientation comprises using a stricture from motion technique.

21. The method of claim 17, wherein deriving a value related to a three-dimensional camera position or orientation comprises using ray casting for sequential two-dimensional images in an iterative process.

22. The method of claim 17, wherein creating a plurality of voxels comprises for each of the plurality of features, processing a plurality of pairs of two-dimensional images to create a point cloud model, the processing including:
   casting a ray through each pixel in the feature in each of first and second two-dimensional images of a pair of two-dimensional images based on the camera position or orientation and the pixel location in each of the first and second two-dimensional images,
   determining the intersections of the rays of the first two-dimensional image with the rays of the second two-dimensional image, and
   creating a voxel for a three-dimensional point cloud model at each intersection.

23. The method of claim 22, wherein determining the intersections comprises:
   comparing the quality values of the pixels associated with the rays through the first and second two-dimensional images; and
   when the quality values fall within a selected bound, determining whether the rays intersect within a second, selected bound.

24. The method of claim 22, wherein creating a voxel comprises averaging the location and quality value data for the intersecting rays and storing this data as a voxel for the point cloud model.

25. The method of claim 22, wherein determining the intersections includes comparing color values.

26. The method of claim 22, wherein creating a voxel comprises storing separately the values for the two intersecting rays to create a gradient field.

27. A computer-readable medium encoded with a computer program for execution by a processor to perform a method comprising:
   receiving a number of two-dimensional images of an object;
   tracking the locations of a plurality of features through the two-dimensional images;
   deriving a value related to a three-dimensional camera position or orientation for each two-dimensional image from the locations for the plurality of features;
   creating a plurality of voxels to define the three-dimensional model based on intersections of a plurality of rays that are cast through the pixels of each two-dimensional image using the value related to the three-dimensional camera position or orientation and the feature locations; and
   converting the point cloud to a polygon-based format.

28. The medium of claim 27, wherein receiving a number of two-dimensional images comprises receiving a video stream recorded with a video camera while moving the camera with respect to the location of the object.

29. The medium of claim 27, wherein tracking the location of a plurality of features through the two-dimensional images comprises using edge detection to identify features and optical flow analysis to track the features through the two-dimensional images.

30. The medium of claim 27, wherein deriving a value related to a three-dimensional camera position or orientation comprises using a structure from motion technique.

31. The medium of claim 27, wherein deriving a value related to a three-dimensional camera position or orientation comprises using ray casting for sequential two-dimensional images in an iterative process.

32. The medium of claim 27, wherein creating a plurality of voxels comprises for each of the plurality of features, processing a plurality of pairs of two-dimensional images to create a point cloud model, the processing including:
   casting a ray through each pixel in the feature in each of first and second two-dimensional images of a pair of two-dimensional images based on the camera position or orientation and the pixel location in each of the first and second two-dimensional images,
   determining the intersections of the rays of the first two-dimensional image with the rays of the second two-dimensional image, and
   creating a voxel for a three-dimensional point cloud model at each intersection.

33. The medium of claim 32, wherein determining the intersections comprises:
   comparing the quality values of the pixels associated with the rays through the first and second two-dimensional images; and
   when the quality values fall within a selected bound, determining whether the rays intersect within a second, selected bound.

34. The medium of claim 32, wherein creating a voxel comprises averaging the location and quality value data for the intersecting rays and storing this data as a voxel for the point cloud model.

35. The medium of claim 32, wherein determining the intersections includes comparing color values.

36. The medium of claim 32, wherein creating a voxel comprises storing separately the values for the two intersecting rays to create a gradient field.

37. A system for automatically generating a three-dimensional model from a number of two-dimensional images of an object, the system comprising:
   a source of two-dimensional images; and
   a programmed computer, coupled to the source of two-dimensional images, the programmed computer including a storage medium with program code stored thereon for performing the method comprising:
   receiving a number of two-dimensional images of the object;
   tracking the locations of a plurality of features through the number of two-dimensional images;
   deriving a value related to a three-dimensional camera position or orientation for each two-dimensional image from the location for the plurality of features;
   creating a plurality of voxels to define the three-dimensional model based on intersections of a plurality of rays that are cast through the pixels of each two-dimensional image using the value related to the three-dimensional camera position or orientation and the feature locations; and
   converting the point cloud to a polygon-based format.

38. The system of claim 37, wherein the source of two-dimensional images comprises a video camera that records images while moving the camera with respect to the location of the object.

39. The system of claim 37, wherein tracking the location of a plurality of features through the two-dimensional images comprises using edge detection to identify features and optical flow analysis to track the features through the two-dimensional images.

40. The system of claim 37, wherein deriving a value related to a three-dimensional camera position or orientation comprises using a structure from motion technique.

41. The system of claim 37, wherein deriving a value related to a three-dimensional camera position or orientation comprises using ray casting for sequential images in an iterative process.

42. The system of claim 37, wherein creating a plurality of voxels comprises for each of the plurality of features, processing a plurality of pairs of two-dimensional images to create a point cloud model, the processing including:

casting a ray through each pixel in the feature in each of first and second two-dimensional images of a pair of two-dimensional images based on the camera position or orientation and the pixel location in each of the first and second two-dimensional images, determining the intersections of the rays of the first two-dimensional image with the rays of the second two-dimensional image, and creating a voxel for a three-dimensional point cloud model at each intersection.

43. The system of claim 42, wherein determining the intersections comprises:

comparing the quality values of the pixels associated with the rays through the first and second two-dimensional images; and when the quality values fall within a selected bound, determining whether the rays intersect within a second, selected bound.

44. The system of claim 42, wherein creating a voxel comprises averaging the location and quality value data for the intersecting rays and storing this data as a voxel for the point cloud model.

45. The system of claim 42, wherein determining the intersections includes comparing color values.

46. The system of claim 42, wherein creating a voxel comprises storing separately the values for the two intersecting rays to create a gradient field.

* * * * *